United States Patent
Eickhoff et al.

(10) Patent No.: US 10,074,862 B2
(45) Date of Patent: Sep. 11, 2018

(54) HYDROGEN-GENERATING COMPOSITIONS FOR A FUEL CELL

(71) Applicant: Honeywell International Inc., Morris Plains, NJ (US)

(72) Inventors: Steven J. Eickhoff, Brooklyn Park, MN (US); Douglas Knight, Merritt Island, FL (US); Hao Huang, Titusville, FL (US); Jason Stimits, Merritt Island, FL (US)

(73) Assignee: Intelligent Energy Limited, Loughborough (GB)

( * ) Notice: Subject to any disclaimer, the term of this patent is extended or adjusted under 35 U.S.C. 154(b) by 176 days.

(21) Appl. No.: 15/132,798

(22) Filed: Apr. 19, 2016

(65) Prior Publication Data

US 2017/0301930 A1 Oct. 19, 2017

(51) Int. Cl.
| | |
|---|---|
| *H01M 4/04* | (2006.01) |
| *H01M 8/04089* | (2016.01) |
| *C01B 3/06* | (2006.01) |
| *H01M 8/1007* | (2016.01) |
| *C01B 6/02* | (2006.01) |
| *C01B 6/04* | (2006.01) |
| *C01B 6/06* | (2006.01) |
| *C01B 6/10* | (2006.01) |
| *C01B 6/15* | (2006.01) |
| *C01B 6/24* | (2006.01) |
| *H01M 8/065* | (2016.01) |

(52) U.S. Cl.
CPC ......... *H01M 8/04089* (2013.01); *C01B 3/065* (2013.01); *C01B 6/02* (2013.01); *C01B 6/04* (2013.01); *C01B 6/06* (2013.01); *C01B 6/10* (2013.01); *C01B 6/15* (2013.01); *C01B 6/243* (2013.01); *H01M 8/065* (2013.01); *H01M 8/1007* (2016.02)

(58) Field of Classification Search
None
See application file for complete search history.

(56) References Cited

U.S. PATENT DOCUMENTS

| | | | | |
|---|---|---|---|---|
| 7,803,349 B1 * | 9/2010 | Muradov | ................ | C01B 3/065 423/650 |
| 7,837,976 B2 | 11/2010 | Sandrock et al. | | |
| 8,172,928 B2 * | 5/2012 | Eickhoff | ............... | H01M 4/383 429/188 |
| 8,377,178 B2 | 2/2013 | Eickhoff et al. | | |
| 9,192,928 B1 * | 11/2015 | Smith | ................ | B01J 38/485 |
| 2006/0013766 A1 | 1/2006 | Vajo et al. | | |
| 2006/0059778 A1 | 3/2006 | Shurtleff et al. | | |
| 2006/0269470 A1 | 11/2006 | Zhang et al. | | |
| 2007/0025908 A1 * | 2/2007 | Sandrock | .............. | C01B 3/0026 423/644 |
| 2008/0090121 A1 | 4/2008 | Zhao | | |
| 2010/0055508 A1 | 3/2010 | Renn | | |
| 2010/0178573 A1 * | 7/2010 | Eickhoff | ............... | H01M 4/383 429/421 |
| 2010/0183937 A1 * | 7/2010 | Halloran | .................. | C01B 3/38 429/452 |
| 2010/0239495 A1 | 9/2010 | Matsumoto | | |
| 2011/0027668 A1 | 2/2011 | Bae et al. | | |
| 2011/0214996 A1 * | 9/2011 | Yoshida | .................... | C01B 3/04 205/633 |
| 2011/0250514 A1 * | 10/2011 | Ramaswamy | .... | H01M 8/04164 429/414 |
| 2013/0177823 A1 * | 7/2013 | Nguyen | .............. | H01M 8/0625 429/411 |
| 2014/0147375 A1 * | 5/2014 | Gonthier | .................... | B01J 7/02 423/657 |
| 2015/0171455 A1 * | 6/2015 | Mills | ...................... | H01M 8/144 429/422 |
| 2016/0365589 A1 * | 12/2016 | Iftime | ..................... | B29C 35/02 |
| 2017/0294668 A1 * | 10/2017 | Eickhoff | ............... | H01M 8/065 |

FOREIGN PATENT DOCUMENTS

| | | |
|---|---|---|
| CN | 107304040 | 10/2017 |
| DE | 102013211106 A1 | 12/2014 |
| JP | 2002-187595 A | 7/2002 |
| JP | 2006-298670 A | 11/2006 |
| JP | 2007-117989 A | 5/2007 |
| JP | 2007-210878 A | 8/2007 |
| WO | WO-98/30493 A2 | 7/1998 |

OTHER PUBLICATIONS

Diaz, H., et al., "Thermodynamic and Structural properties of LaNi5-yAly compounds and their related hydrides", International Journal of Hydrogen Energy, 4(5), (1979), 445-454.
"European Application Serial No. 17165327.2, Extended European Search Report dated May 29, 2017", 9 pgs.

* cited by examiner

*Primary Examiner* — Scott J Chmielecki
(74) *Attorney, Agent, or Firm* — Baker Hostetler LLP (57) ABSTRACT

Various embodiments disclosed related to hydrogen-generating compositions for a fuel cell. In various embodiments, the present invention provides a hydrogen-generating composition comprising a hydride and a Lewis acid. Various embodiments provide methods of using a hydrogen fuel cell including generating hydrogen gas using the composition, fuel cell systems including the composition, and methods of making the composition.

15 Claims, 4 Drawing Sheets

HYDROGEN-GENERATING COMPOSITIONS FOR A FUEL CELL

BACKGROUND

Vapor phase hydrolysis of materials to form hydrogen represents a commercially viable strategy for a fuel cell system capable of achieving volumetric and gravimetric energy density several times greater than that of lithium polymer batteries. One limitation of this technology is the very slow reaction rate of the fuel with water vapor. To achieve high volumetric energy density, the fuel must be pressed into pellet form; however, once in pellet form the fuel is even slower to react and produce hydrogen. Slow hydrogen production can result in very low rate capability of the fuel cell rendering the technology inadequate for applications relying on higher power to be commercially viable. Although the surface area of the hydrogen-generating material can be increased, or the amount of hydrogen-generating material can be increased, this can result in higher cost, lower energy density, and can increase the size of the product to a point where it is too large to be commercially feasible for traditional consumer electronics such as smart phones.

Another limitation of vapor phase hydrolysis to form hydrogen for a fuel cell system is the formation of unwanted products from the material being hydrolyzed such as hydrated hydroxides. Hydrated hydroxides form when temperature and humidity conditions are in a range where hydrated hydroxides form during the reaction instead of the desired unhydrated hydroxide. When byproducts such as hydrated hydroxides are formed, the hydrogen-generating material can take on additional mass which reduces gravimetric energy density. The formation of byproducts such as hydrates also results in significant volume expansion which reduces volumetric energy density. In addition, byproduct formation such as hydrate formation can result in reduced hydrogen generation rate capability as water that could be used for hydrogen generation can be bound as a hydrate or other byproduct.

SUMMARY

A hydrogen-generating composition for a fuel cell includes a hydride and a Lewis acid.

In various embodiments, the hydrogen-generating composition includes a hydride chosen from lithium aluminum hydride ($LiAlH_4$), calcium hydride ($CaH_2$), sodium aluminum hydride ($NaAlH_4$), aluminum hydride ($AlH_3$), and a combination thereof, wherein the hydride is about 70 wt % to about 99.9 wt % of the hydrogen-generating composition. The hydrogen-generating composition also includes a Lewis acid chosen from aluminum chloride ($AlCl_3$), magnesium chloride ($MgCl_2$), zirconium (IV) chloride ($ZrCl_4$), and a combination thereof, wherein the Lewis acid is about 0.1 wt % to about 30 wt % of the hydrogen-generating composition.

In various embodiments, the hydrogen-generating composition includes a hydride chosen from lithium aluminum hydride ($LiAlH_4$), calcium hydride ($CaH_2$), sodium aluminum hydride ($NaAlH_4$), aluminum hydride ($AlH_3$), and a combination thereof, wherein the hydride is about 60 wt % to about 90 wt % of the hydrogen-generating composition. The hydrogen-generating composition includes a Lewis acid chosen from aluminum chloride ($AlCl_3$), magnesium chloride ($MgCl_2$), zirconium (IV) chloride ($ZrCl_4$), and a combination thereof, wherein the Lewis acid is about 5 wt % to about 30 wt % of the hydrogen-generating composition. The hydrogen-generating composition also includes titanium (IV) oxide, wherein the titanium (IV) oxide is about 1 wt % to about 10 wt % of the hydrogen-generating composition.

A method of using a hydrogen fuel cell includes contacting a hydrogen-generating composition with water vapor, to form hydrogen gas. The hydrogen-generating composition includes a hydride and a Lewis acid. The method also includes supplying the hydrogen gas to an electrode of the hydrogen fuel cell.

A method of using a hydrogen fuel cell includes contacting a hydrogen-generating composition with water vapor, to form hydrogen gas. The hydrogen-generating composition includes a hydride chosen from lithium aluminum hydride ($LiAlH_4$), calcium hydride ($CaH_2$), sodium aluminum hydride ($NaAlH_4$), aluminum hydride ($AlH_3$), and a combination thereof, wherein the hydride is about 70 wt % to about 99.9 wt % of the hydrogen-generating composition. The hydrogen-generating composition also includes a Lewis acid chosen from aluminum chloride ($AlCl_3$), magnesium chloride ($MgCl_2$), zirconium (IV) chloride ($ZrCl_4$), and a combination thereof, wherein the Lewis acid is about 0.1 wt % to about 30 wt % of the hydrogen-generating composition. The method includes supplying the hydrogen gas to an electrode of the hydrogen fuel cell. In various embodiments, the hydrogen-generating composition further includes titanium (IV) oxide, wherein the titanium (IV) oxide is about 1 wt % to about 10 wt % of the hydrogen-generating composition.

A fuel cell system includes a hydrogen-generating composition including a hydride and a Lewis acid. The system also includes a hydrogen fuel cell fluidly connected to the hydrogen-generating composition.

A fuel cell system includes a hydrogen-generating composition that includes a hydride chosen from lithium aluminum hydride ($LiAlH_4$), calcium hydride ($CaH_2$), sodium aluminum hydride ($NaAlH_4$), aluminum hydride ($AlH_3$), and a combination thereof, wherein the hydride is about 70 wt % to about 99.9 wt % of the hydrogen-generating composition. The hydrogen-generating composition also includes a Lewis acid chosen from aluminum chloride ($AlCl_3$), magnesium chloride ($MgCl_2$), zirconium (IV) chloride ($ZrCl_4$), and a combination thereof, wherein the Lewis acid is about 0.1 wt % to about 30 wt % of the hydrogen-generating composition. The system also includes a hydrogen fuel cell fluidly connected to the hydrogen-generating composition. In various embodiments, the hydrogen-generating composition further includes titanium (IV) oxide, wherein the titanium (IV) oxide is about 1 wt % to about 10 wt % of the hydrogen-generating composition.

A method of making a hydrogen-generating composition includes forming a starting composition. The starting composition includes a hydride and a Lewis acid. The method also includes mixing the starting composition to substantial homogeneity, to form the hydrogen-generating composition.

A method of making a hydrogen-generating composition includes forming a starting composition. The starting composition includes a hydride chosen from lithium aluminum hydride ($LiAlH_4$), calcium hydride ($CaH_2$), sodium aluminum hydride ($NaAlH_4$), aluminum hydride ($AlH_3$), and a combination thereof, wherein the hydride is about 70 wt % to about 99.9 wt % of the starting composition. The starting composition also includes a Lewis acid chosen from aluminum chloride ($AlCl_3$), magnesium chloride ($MgCl_2$), zirconium (IV) chloride ($ZrCl_4$), and a combination thereof, wherein the Lewis acid is about 0.1 wt % to about 30 wt % of the starting composition. The method also includes mixing the starting composition to substantial homogeneity, to form the hydrogen-generating composition. In various embodiments, the hydrogen-generating composition further includes titanium (IV) oxide, wherein the titanium (IV) oxide is about 1 wt % to about 10 wt % of the hydrogen-generating composition.

In various embodiments, the hydrogen-generating composition of the present invention has certain advantages over other hydrogen-generating compositions, at least some of which are unexpected. For example, in some embodiments, the hydrogen-generating composition of the present invention can react with water vapor to produce hydrogen with a higher rate of hydrogen generation than other hydrogen-generating compositions. In some embodiments, the hydrogen-generating fuel composition of the present invention can break up during the hydrogen production to a greater extent than other hydrogen-generating fuel compositions, allowing increased contact between water vapor and the remaining fuel composition.

In various embodiments, the hydrogen-generating composition of the present invention can form fewer unwanted byproducts during reaction with water vapor, such as less hydrates, as compared to other hydrogen-generating compositions. In various embodiments, the reduced formation of byproducts such as hydrates can reduce or avid generation of additional mass in the hydrogen-generating composition from the byproducts, achieving a higher overall gravimetric and volumetric energy density. In various embodiments, by providing a higher gravimetric or volumetric energy density, the hydrogen-generating composition can be used to form more efficient fuel cell systems than possible using other hydrogen-generating compositions.

BRIEF DESCRIPTION OF THE FIGURES

The drawings illustrate generally, by way of example, but not by way of limitation, various embodiments discussed in the present document.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z." unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Hydrogen-generating Composition for a Fuel Cell.

In various embodiments, the present invention provides a hydrogen-generating composition for a fuel cell. The hydrogen-generating composition can include a hydride and a Lewis acid. The hydrogen-generating composition can be combined with water to generate hydrogen gas. The phase of the water contacted with the hydrogen-generating composition to generate the hydrogen gas can be any suitable phase, such as liquid water (e.g., in a pure state, diluted state, or such as having one or more compounds or solvents dissolved therein) or gaseous water (e.g., water vapor, at any suitable concentration). The generated hydrogen gas can be used as the fuel for a hydrogen-consuming fuel cell.

The hydrogen-generating composition can be in any suitable form. The hydrogen-generating composition can be in the form of a loose powder, or a compressed powder. The hydrogen-generating composition can be in the form of grains or pellets (e.g., a powder or grains compressed into pellets). The hydrogen-generating composition can have any suitable density, such as about 0.5 $g/cm^3$ to about 1.5 $g/cm^3$, or about 0.5 $g/cm^3$ or less, or less than, equal to, or greater than about 0.6 $g/cm^3$, 0.7, 0.8, 0.9, 1, 1.1, 1.2, 1.3, 1.4 $g/cm^3$, or about 1.5 $g/cm^3$ or more.

In some embodiments, when contacted with water the hydrogen-generating composition forms fewer (e.g., a smaller mass per mass of hydrogen formed) non-hydrogen materials as compared to a corresponding hydrogen-generating composition including less or none of the Lewis acid.

The non-hydrogen materials that are formed less or not at all during hydrogen production can be hydrates (e.g., hydrated hydroxides) of the hydride in the hydrogen-generating composition. By avoiding production of unwanted (e.g., non-hydrogen) materials during hydrogen generation, the amount of hydrogen that can be produced per mass of the hydrogen-generating composition can be greater than that of a corresponding hydrogen-generating composition including less or none of the Lewis acid or less or none of the metal oxide.

In some embodiments, when contacted with water the hydrogen-generating composition forms hydrogen gas at a higher rate as compared to a corresponding hydrogen-generating composition including less or none of the Lewis acid. For example, a given mass of the hydrogen-generating composition can form a given number of moles of hydrogen gas in less time when contacted with a given mass of water as compared to the amount of time required for the same mass of a corresponding hydrogen-generating composition, including less or none or the Lewis acid or including less or none of the metal oxide, contacted with the same mass of water to produce the same number of moles of hydrogen gas. The rate of hydrogen generation of embodiments of the hydrogen-generating composition can exceed the rate of a corresponding hydrogen-generating composition including less or none or the Lewis acid or including less or none of the metal oxide by any suitable amount; for example, the rate can be greater than 1 times greater to equal to or less than about 20 times greater as compared to a corresponding hydrogen-generating composition including less or none of the Lewis acid, or about 2.5 to about 7.5 times greater, or about 2 times greater or less, or less than, equal to, or greater than about 2.5 times greater, 3, 3.5, 4, 4.5, 5, 5.5, 6, 6.5, 7, 7.5, 8, 9, 10, 11, 12, 13, 14, 15, 16, 18, or about 20 or more times greater.

In some embodiments, the hydrogen-generating composition is substantially free of elemental metals. In some embodiments, the hydrogen-generating composition can be substantially free of elemental aluminum.

Hydride.

The hydrogen-generating composition includes one or more hydrides. The one or more hydrides can form any suitable proportion of the hydrogen-generating composition, such as about 50 wt % to about 99.999 wt %, about 70 wt % to about 99.9 wt %, about 70 wt % to about 90 wt %, or about 50 wt % or less, or less than, equal to, or greater than about 52 wt %, 54, 56, 58, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98, 99, 99.9, 99.99, or about 99.999 wt % or more.

The hydride can be any suitable hydride, such that the hydrogen-generating composition can be used as described herein. The hydride can be a compound in which one or more hydrogen centers (e.g., one or more hydrogen atoms, or a group that includes one or more hydrogen atoms) having nucleophilic, reducing, or basic properties. The hydrogen atom in the hydride can be bonded to a more electropositive element or group. For example, the hydrogen can be chosen from an ionic hydride (e.g., a hydrogen atom bound to an electropositive metal, such as an alkali metal or alkaline earth metal), a covalent hydride (e.g., compounds including covalently bonded hydrogen and that react as hydride, such that the hydrogen atom or hydrogen center has nucleophilic properties, reducing properties, basic properties, or a combination thereof), a metallic hydride (e.g., interstitial hydrides that exist within metals or alloys), a transition metal hydride complex (e.g., including compounds that can be classified as covalent hydrides or interstitial hydrides, such as including a single bond between the hydrogen atom and a transition metal), or a combination thereof.

The hydride can be chosen from magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$. $TiFeH_2$, and a combination thereof. The hydride can be chosen from lithium aluminum hydride ($LiAlH_4$), calcium hydride ($CaH_2$), sodium aluminum hydride ($NaAlH_4$), aluminum hydride ($AlH_3$), and a combination thereof. The hydride can be lithium aluminum hydride ($LiAlH_4$).

In some embodiments, the hydrogen-generating composition only includes a single hydride and is substantially free of other hydrides. In some embodiments, the hydrogen-generating composition only includes one or more hydrides chosen from lithium aluminum hydride ($LiAlH_4$), calcium hydride ($CaH_2$), sodium aluminum hydride ($NaAlH_4$), and aluminum hydride ($AlH_3$), and is substantially free of other hydrides. In some embodiments, the hydrogen-generating composition only includes the hydride lithium aluminum hydride ($LiAlH_4$), and is substantially free of other hydrides. In some embodiments, the hydrogen-generating composition can be substantially free of simple hydrides that are a metal atom directly bound to a hydrogen atom. In some embodiments, the hydrogen-generating composition can be substantially free of lithium hydride and beryllium hydride.

In some embodiments, the hydrogen-generating composition can be substantially free of hydrides of aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), vanadium (V), tungsten (W), yttrium (Y), ytterbium (Yb), zinc (Zn), zirconium (Zr), hydrides of organic cations including ($CH_3$) methyl groups, or a combination thereof. In various embodiments, the hydrogen-generating composition can be substantially free of one or more of lithium hydride (LiH), sodium hydride (NaH), potassium hydride (KH), magnesium hydride ($MgH_2$), calcium hydride ($CaH_2$), lithium aluminum hydride ($LiAlH_4$), sodium borohydride ($NaBH_4$), lithium borohydride ($LiBH_4$), magnesium borohydride $Mg(BH_4)_2$, sodium aluminum hydride ($NaAlH_4$), or mixtures thereof.

In some embodiments, the hydrogen-generating composition includes a metal hydride (e.g., an interstitial intermetallic hydride). Metal hydrides can reversibly absorb hydrogen into their metal lattice. The metal hydride can be any suitable metal hydride. The metal hydride can be $LaNi_5$, $LaNi_{4.6}Mn_{0.4}$, $MnNi_{3.5}Co_{0.7}Al_{0.8}$, $MnNi_{4.2}Co_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, $LaNi_{4.7}Al_{0.3}$, $LaNi_{5-x}Al_x$ wherein x is about 0 to about 1, or any combination thereof. The metal hydride can be $LaNi_{5-x}Al_x$ wherein x is about 0 to about 1 (e.g., from $LaNi_5$ to $LaNi_4Al$). The metal hydride can form any suitable proportion of the hydrogen-generating composition, such as about 10 wt % to about 99.999 wt %, or about 20 wt % to about 99.5 wt %, or about 10 wt % or less, or less than, equal to, or greater than about 15 wt %, 20, 21, 22, 23, 24, 25, 26, 27, 28, 29, 30, 35, 40, 45, 50, 55, 60, 65, 70, 75, 80, 85, 90, 91, 92, 93, 94, 95, 96, 97, 98, 99, 99.5, 99.9, 99.99, or about 99.999 wt % or more. Any metal hydride that is described in U.S. Pat. No. 8,172,928, incorporated by reference herein in its entirety, can be included in the present hydrogen-generating composition.

The hydrogen-generating composition can include both a metal hydride (e.g., an interstitial intermetallic hydride, such as $LaNi_{5-x}Al_x$ wherein x is about 0 to about 1), and a chemical hydride (e.g., an ionic hydride or a covalent hydride, such as magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof). In some embodiments, the hydrogen-generating composition can include a uniform blend of the chemical hydride, the metal hydride, and the Lewis acid. In some embodiments, the hydrogen-generating composition can include the metal hydride separate from a mixture of the chemical hydride and the Lewis acid, such as a fuel pellet including a metal hydride and a different fuel pellet including an intimate mixture of a chemical hydride and a Lewis acid.

A hydrogen-generating composition including a chemical hydride, a metal hydride, and a Lewis acid can include any suitable proportion of the chemical hydride, such as about 0.5 wt % to about 65 wt %, or about 0.5 wt % or less, or less than, equal to, or greater than about 1 wt %, 2, 3, 4, 5, 10, 15, 20, 25, 30, 35, 40, 45, 50, 55, 60, or about 65 wt % or more. A hydrogen-generating composition including a chemical hydride, a metal hydride, and a Lewis acid can include any suitable proportion of the metal hydride, such as about 20 wt % to about 99.5 wt %, or about 20 wt % or less, or less than, equal to, or greater than about 25 wt %, 30, 35, 40, 45, 50, 55, 60, 65, 70, 75, 80, 85, 90, 95, 96, 97, 98, 99, or about 99.5 wt % or more. A hydrogen-generating composition including a chemical hydride, a metal hydride, and a Lewis acid can include any suitable proportion of the Lewis acid, such as about 0.1 wt % to about 20 wt %, or about 0.1 wt % or less, or less than, equal to, or greater than about 0.5 wt %, 1, 2, 3, 4, 5, 6, 8, 10, 12, 14, 16, 18, or about 20 wt % or more. In one example, a hydrogen-generating composition includes 5 vol % $LaNi_{5-x}Al_x$ wherein x is about 0 to about 1, and is about 60.9 wt % $LaAlH_4$, about 15.2 wt % $ZrCl_4$, and about 23.8 wt % $LaNi_{5-x}Al_x$. In another example, the hydrogen-generating composition includes 95 vol % $LaNi_{5-x}Al_x$ wherein x is about 0 to about 1, and is about 0.7 wt % $LiAlH_4$, about 0.2 wt % $ZrCl_4$, and about 99.1 wt % $LaNi_{5-x}Al_x$.

Lewis Acid.

The hydrogen-generating composition includes one or more Lewis acids. The one or more Lewis acids can form any suitable proportion of the hydrogen-generating composition, such as about 0.001 wt % to about 50 wt % of the hydrogen-generating composition, about 0.1 wt % to about 30 wt %, about 10 wt % to about 30 wt %, about 0.001 wt % or less, or less than, equal to, or greater than about 0.01 wt %, 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 42, 44, 46, 48, or about 50 wt % or more.

The Lewis acid can be any suitable Lewis acid, such that the hydrogen-generating composition can be used as described herein. The Lewis acid can be an inorganic compound or an organometallic compound in which a cation of the Lewis acid is selected from the group consisting of scandium, titanium, vanadium, chromium, manganese, iron, cobalt, copper, zinc, boron, aluminum, yttrium, zirconium, niobium, molybdenum, cadmium, rhenium, lanthanum, erbium, ytterbium, samarium, tantalum, and tin. The anion of the Lewis acid can be a halide. The Lewis acid can be chosen from aluminum chloride ($AlCl_3$), aluminum bromide ($AlBr_3$), aluminum fluoride ($AlF_3$), stannous (II) chloride ($SnCl_2$), stannous (II) bromide ($SnBr_2$), stannous (II) fluoride ($SnF_2$), magnesium chloride ($MgCl_2$), magnesium bromide ($MgBr_2$), magnesium fluoride ($MgF_2$), zirconium (IV) chloride ($ZrCl_4$), zirconium (IV) bromide ($ZrBr_4$), zirconium (IV) fluoride ($ZrF_4$), tungsten (VI) chloride ($WCl_6$), tungsten (VI) bromide ($WBr_6$), tungsten (VI) fluoride ($WF_6$), zinc chloride ($ZnCl_2$), zinc bromide ($ZnBr_2$), zinc fluoride ($ZnF_2$), ferric (III) chloride ($FeCl_3$), ferric (III) bromide ($FeBr_3$), ferric (III) fluoride ($FeF_3$), vanadium (III) chloride, vanadium (III) bromide, vanadium (III) fluoride, and a combination thereof. The Lewis acid can be chosen from aluminum chloride ($AlCl_3$), magnesium chloride ($MgCl_2$), zirconium (IV) chloride ($ZrCl_4$), and a combination thereof. The Lewis acid can be zirconium (IV) chloride ($ZrCl_4$).

Metal Oxide.

In various embodiments, the hydrogen-generating composition can include one or more metal oxides. In some embodiments, the hydrogen-generating composition can be free of metal oxides. The one or more metal oxides can form any suitable proportion of the hydrogen-generating composition, such as about 0.001 wt % to about 20 wt % of the hydrogen-generating composition, about 1 wt % to about 10 wt %, or about 0.001 wt % or less, or less than, equal to, or greater than about 0.01, 0.1, 1, 2, 3, 4, 5, 6, 7, 8, 9, 10, 12, 14, 16, 18, or about 20 wt % or more.

The metal oxide can be any suitable metal oxide, such that the hydrogen-generating composition can be used as described herein. The metal oxide can be zirconium (IV) oxide, hafnium (IV) oxide, titanium (IV) oxide, or a combination thereof. The metal oxide can be titanium (IV) oxide.

Fuel Cell System.

In various embodiments, the present invention provides fuel cell system. The fuel cell system can be any suitable fuel cell system that includes an embodiment of the hydrogen-generating composition described herein and a hydrogen-consuming fuel cell fluidly connected thereto.

The hydrogen-consuming fuel cell can include an anode, a cathode, and an electrically-insulating ion-conducting electrolyte (e.g., a membrane, such as a proton exchange membrane, or PEM) separating the anode and cathode, wherein at least one of the anode or cathode undergoes a chemical reaction that consumes hydrogen and generates an electrical potential across the electrodes. In some embodiments, the cathode of the fuel cell consumes hydrogen gas and generates electrons and hydrogen ions. The hydrogen ions can travel across the electrolyte to the cathode, while the electrons can travel to the cathode via an electrical circuit connecting the anode to the cathode. At the cathode, the hydrogen ions can react with oxygen gas and the electrons produced by the anode to form water.

Method of Using a Hydrogen Fuel Cell.

In various embodiments, the present invention provides a method of using a hydrogen fuel cell. The method can include contacting am embodiment of the hydrogen-generating composition including a hydride and a Lewis acid with water (e.g., liquid water in a pure or diluted state, or water vapor at any suitable concentration) to form hydrogen gas. The water can originate from any suitable source. In some embodiments, the water can be water vapor produced by a fuel cell, such as produced by the hydrogen fuel cell to which hydrogen is supplied by the hydrogen-generating composition. The method can include providing the hydrogen formed by the hydrogen-generating composition to a suitable hydrogen fuel cell (e.g., a hydrogen-consuming fuel cell), such as to a hydrogen-consuming electrode of the hydrogen fuel cell (e.g., an anode or a cathode). The hydrogen gas can be provided to the electrode in any suitable way, such as via a conduit, pipe, or other fluid connection between the hydrogen-generating material and the electrode. The fluid connection can include one or more valves or other apparatus for controlling the flow rate of the generated hydrogen to the electrode. The fluid connection can include one or more storage areas for storing generated hydrogen until use.

Method of Making a Hydrogen-generating Composition.

In various embodiments, the present invention provides a method of making a hydrogen-generating composition. The method can be any suitable method that generates an embodiment of the hydrogen-generating composition described herein. For example, the method of making a hydrogen-generating composition can include forming a starting composition including a hydride and a Lewis acid. The method can include mixing the starting composition to form an embodiment of the hydrogen-generating composition described herein.

The starting composition can include a hydride chosen from lithium aluminum hydride ($LiAlH_4$), calcium hydride ($CaH_2$), sodium aluminum hydride ($NaAlH_4$), aluminum hydride ($AlH_3$), and a combination thereof, wherein the hydride is about 70 wt % to about 99.9 wt % of the starting composition. The starting composition can include a Lewis acid chosen from aluminum chloride ($AlCl_3$), magnesium chloride ($MgCl_2$), zirconium (IV) chloride ($ZrCl_4$), and a combination thereof, wherein the Lewis acid is about 0.1 wt % to about 30 wt % of the starting composition. The starting composition can include a metal oxide such as titanium (IV) oxide, wherein the metal oxide is about 1 wt % to about 10 wt % of the hydrogen-generating composition.

The mixing of the starting material composition can include any suitable mixing. The mixing can include mixing the starting material composition to substantial homogeneity. The mixing can include milling, such as ball milling or grinding. The mixing can include mixing with a mixing medium, such as metal beads, metal balls, or a combination thereof. The mixing can include separating the mixing medium and the formed hydrogen-generation composition, such as by using a sieve or sifter.

EXAMPLES

Various embodiments of the present invention can be better understood by reference to the following Examples which are offered by way of illustration. The present invention is not limited to the Examples given herein.

Example 1

Preparation of Samples

Fuel blend pellets were prepared using the following procedure. All materials were handled within an inert and dry confinement within an argon-filled glove box. Lithium aluminum hydride ($LiAlH_4$), the Lewis acid, and any other additives were weighed out and placed together into a polyethylene mixing bottle. Several small steel ball bearings were placed into the mixing bottle and then bottle was sealed with a screw-cap top. The sealed mixing bottle with the fuel blend and mixing beads was placed on a mechanical mixer (a Turbula® mixer) and the fuel blend was allowed to mix for 10-15 minutes. The finished mixed fuel blend was poured out of the mixing bottle into and through a course sieve to remove the mixing beads and then was returned to the mixing bottle. The fuel blend was then ready to be pressed into the desired pellet formation. Pellets were produced using a die that had a fixed volume such that the density of the pellet was determined by the mass of the fuel blend placed into the die. The Samples prepared are shown in Table 1.

For example. Sample 5, a pellet with a volume of 0.131 $cm^3$, with a desired fuel density of 0.62 $g/cm^3$, was prepared following the procedure above using the following calculations. The density of $LiAlH_4$=0.92 $g/cm^3$, the density of $ZrCl_4$=2.8 $g/cm^3$, and the desired fuel mix of 80 wt % $LiAlH_4$ and 20 wt % $ZrCl_4$. D(mix) was calculated as $=1/[(0.8/0.92)+(0.2/2.8)]=1.06$ $g/cm^3$, and $0.62/0.92=x/1.06$, $x=0.714$ $g/cm^3$; and then 0.714 $g/cm^3$(0.131 $cm^3$)=0.093 g. Therefore, 0.093 g of the fuel blend was weighed out and pressed into the desired 0.131 $cm^3$ pellet.

TABLE 1

Samples prepared. All Samples were prepared into pellets having a density of 0.62 $g/cm^3$.

| Sample | Composition |
|---|---|
| 1 | 80 wt % $LiAlH_4$ and 20 wt % $AlCl_3$ |
| 2 | 80 wt % $LiAlH_4$ and 20 wt % $WCl_6$ |
| 3 | 80 wt % $LiAlH_4$ and 20 wt % $VCl_3$ |
| 4 | 80 wt % $LiAlH_4$ and 20 wt % $MgCl_2$ |
| 5 | 80 wt % $LiAlH_4$ and 20 wt % $ZrCl_4$ |
| 6 | 75 wt % $LiAlH_4$ and 20 wt % $AlCl_3$ and 5 wt % $TiO_2$ |
| 7 | 75 wt % $LiAlH_4$ and 20 wt % $MgCl_2$ and 5 wt % $TiO_2$ |
| 8 | 75 wt % $LiAlH_4$ and 20 wt % $ZrCl_4$ and 5 wt % $TiO_2$ |
| 9 | 100 wt % $LiAlH_4$ |
| 10 | 90 wt % $LiAlH_4$ and 10 wt % $AlCl_3$ |
| 11 | 75 wt % $LiAlH_4$ and 25 wt % $AlCl_3$ |
| 12 | 70 wt % $LiAlH_4$ and 30 wt % $AlCl_3$ |
| 13 | 90 wt % $LiAlH_4$ and 10 wt % $ZrCl_4$ |
| 14 | 85 wt % $LiAlH_4$ and 15 wt % $ZrCl_4$ |
| 15 | 75 wt % $LiAlH_4$ and 25 wt % $ZrCl_4$ |

Example 2

Hydrogen Generation Rate

Figure 1:
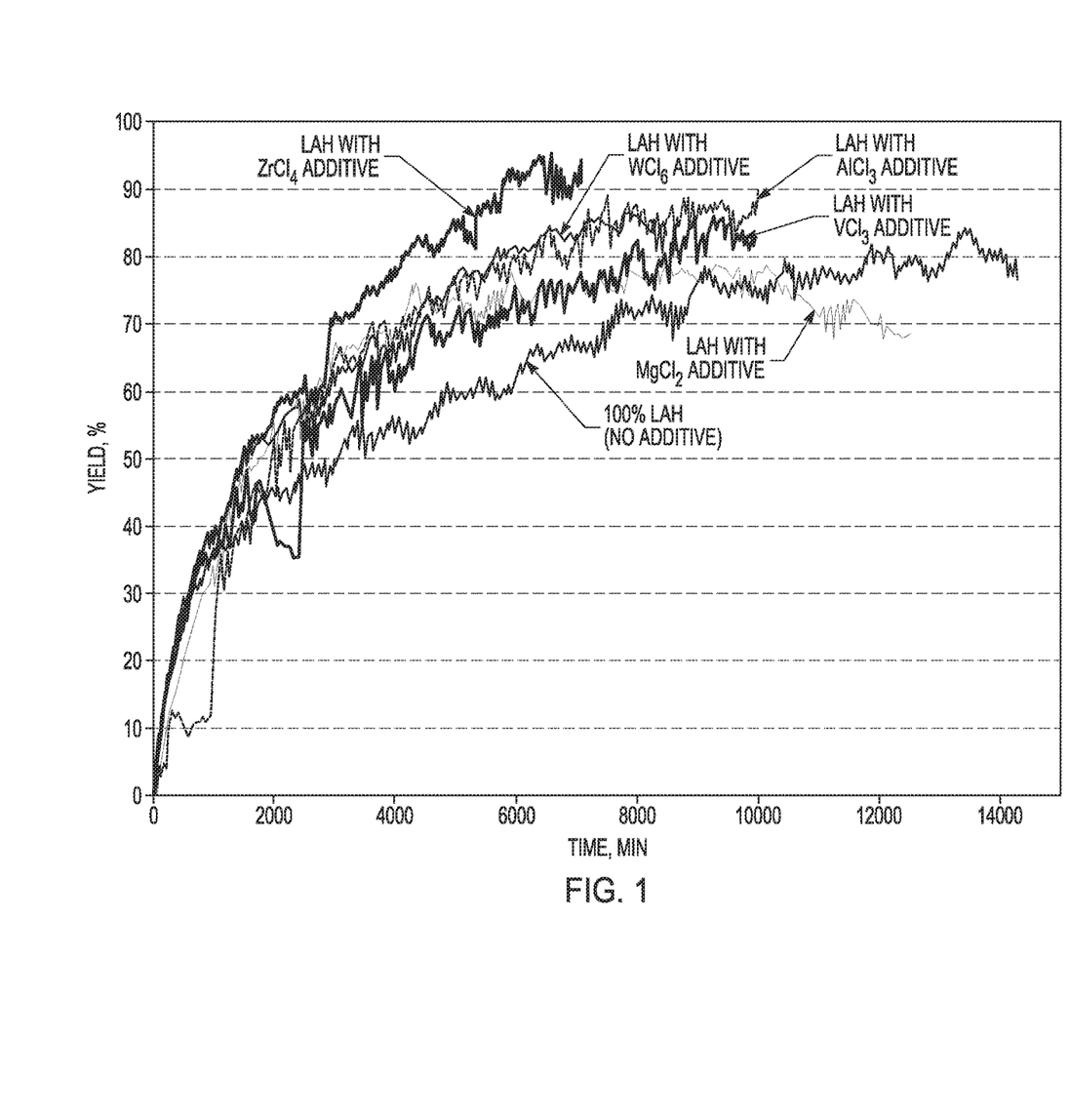
FIG. 1 illustrates a comparison of hydrogen yield for various fuel blends including $LiAlH_4$ and various Lewis acids, in accordance with various embodiments.

Additives that successfully resulted in hydrogen generation rate improvement include zirconium (IV) chloride, tungsten (VI) chloride, vanadium (III) chloride, magnesium chloride, and aluminum chloride. A comparison of the yield performance of these additives is shown in FIG. 1, wherein 100% yield represents the maximum hydrogen yield possible from the Sample. The best-performing additives were zirconium chloride and aluminum chloride. When compared to the base pelletized fuel with no additives or modifications up to a 5× improvement in overall hydrogen generating rate capability was observed.

Embodiments of the present invention are not limited to any particular mechanism of action. The reactivity of the metal chlorides resulted in an acid environment as both $H^+$ and $Cl^-$ ions were formed when the additives came in contact with water. While the $H^+$ ions accelerated the reactivity with the fuels own $H^-$ component, the $Cl^-$ ions were highly reactive to the fuel's lithium [$Li^+$] component. In addition, since the additive was distributed homogeneously throughout the fuel pellet, the continued enhanced reactivity helped to break up the fuel pellet and allowed increased exposure of remaining fuel.

Figure 2:
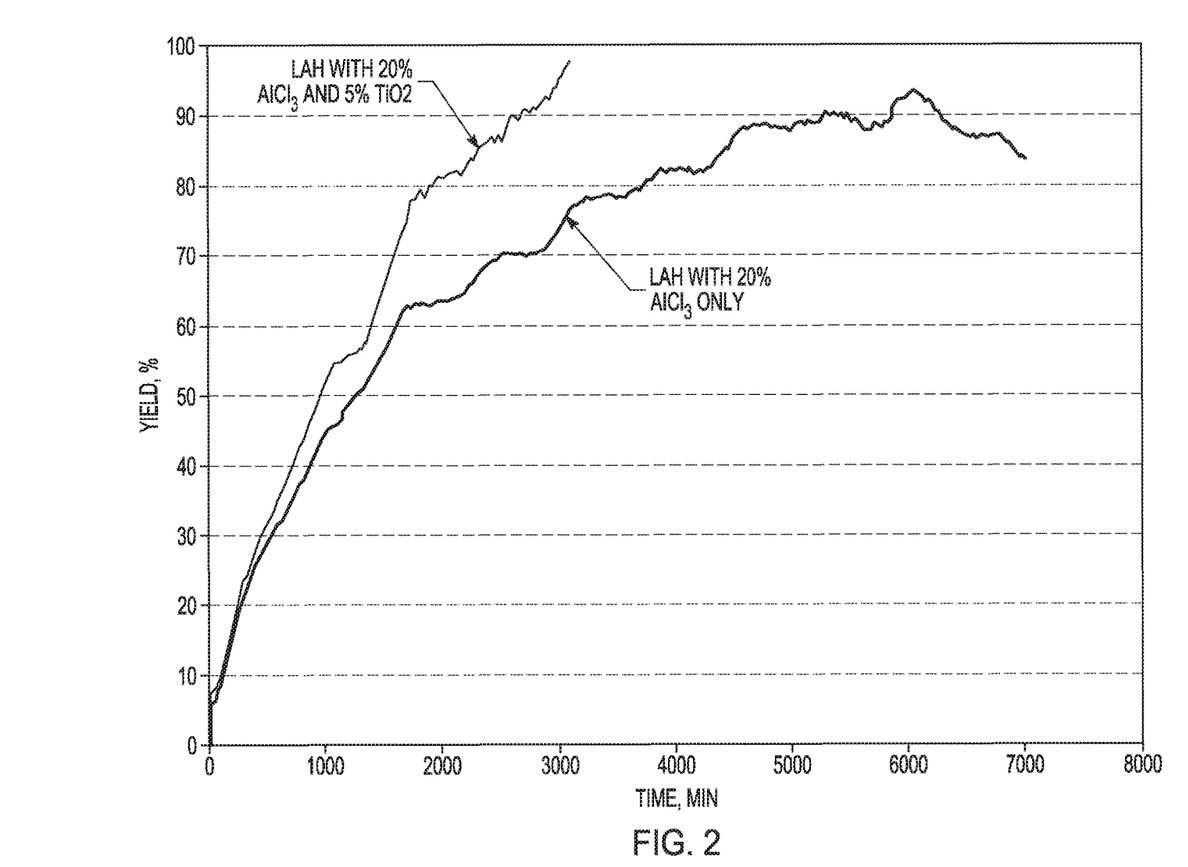
FIG. 2 illustrates hydrogen yield of $LiAlH_4$ with $AlCl_3$ additive, with and without $TiO_2$ catalyst additive, in accordance with various embodiments.

Further enhancement was also observed in Samples that included 5 wt % titanium (IV) oxide in conjunction with the Lewis acid additives. An example of this enhancement was seen with the $AlCl_3$ additive and is shown in FIG. 2. The titanium (IV) oxide additive may have acted as a catalyst that allowed the formation of reactive intermediates, providing alternative reaction pathways that led to the lowering of the overall activation energy of the system.

Figure 3:
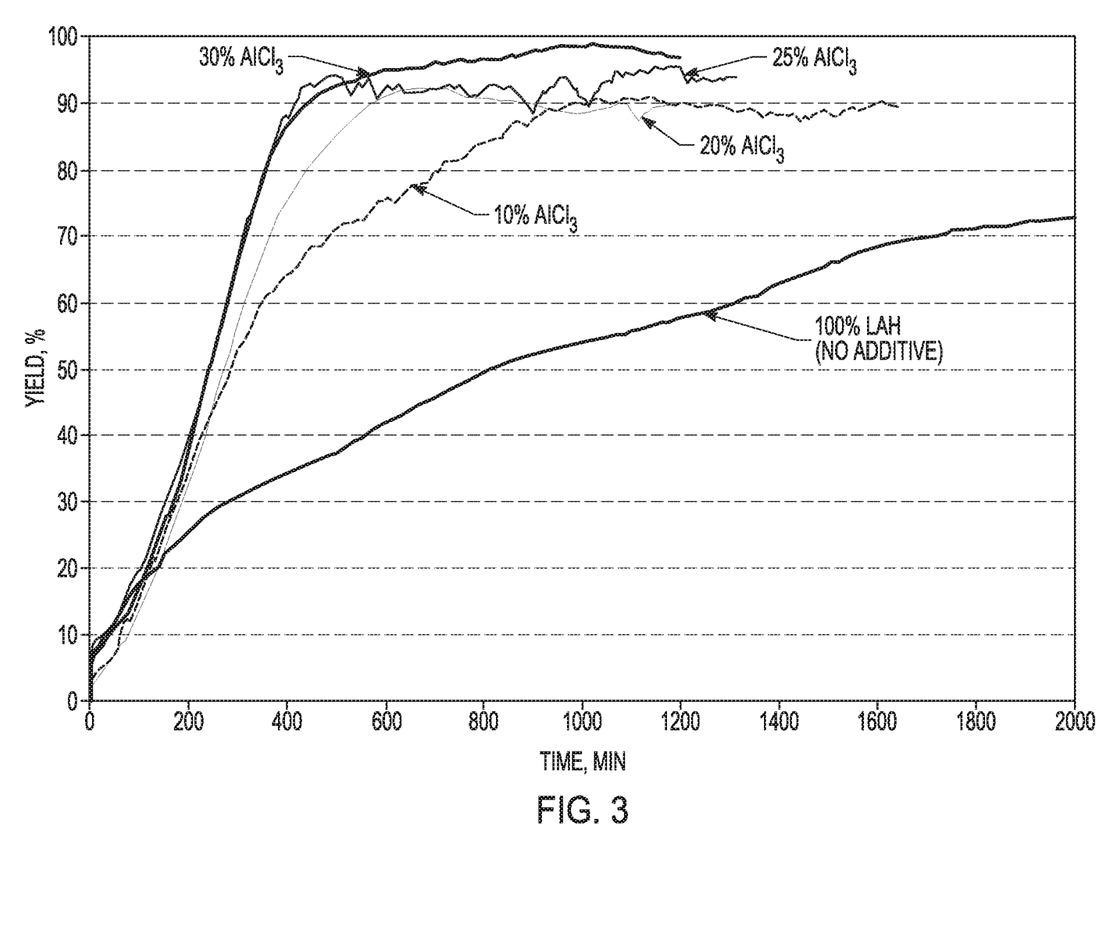
FIG. 3 illustrates a comparison of hydrogen yield from fuel compositions including $LiAlH_4$ and with varying amounts of $AlCl_3$, in accordance with various embodiments.
Figure 4:
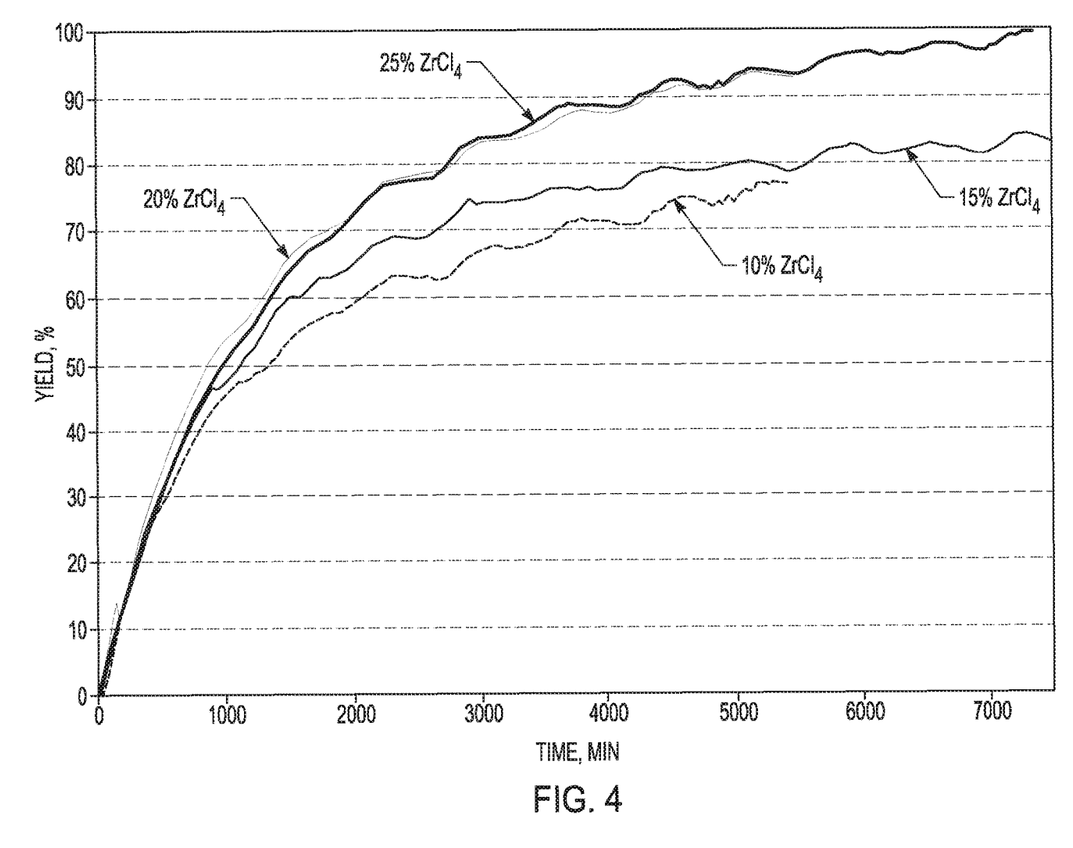
FIG. 4 illustrates a comparison of hydrogen yield from fuel compositions including $LiAlH_4$ and with varying amounts of $ZrCl_4$, in accordance with various embodiments.

The best performing blend of Lewis acid and hydride was 20 wt % zirconium chloride/80 wt % lithium aluminum hydride. Lower amounts (e.g., below 20 wt %) of Lewis acid can be used with the amount added generally correlating to the degree of hydrogenation rate improvement. Slightly better hydrogen generation rate improvement was found above 20 wt % however, minimum additional improvement was seen above about 25 wt %. FIG. 3 (for $AlCl_3$) and FIG. 4 (for $ZrCl_4$) illustrate how the rate was changed with the change in the additive concentration. Other Lewis acids can also be used and show rate improvement with increasing wt % generally within the range mentioned above.

Example 3

Energy Density

Lewis acids that were observed in combination with hydrides to successfully result in reduced formation of unwanted materials (e.g., hydrates) included zirconium (IV) chloride, aluminum chloride, tungsten (VI) chloride, and magnesium chloride. The best performing Lewis acid additive was zirconium chloride, with aluminum chloride and magnesium chloride also performing well. Other additives which showed some reduction of the formation of unwanted materials included vanadium (III) chloride, potassium chloride, aluminum bromide, and aluminum iodide. When compared to the base pelletized fuel with no Lewis acid additives (Sample 9) and the theoretical expectation for mass gain through 100% utilization of the base fuel, it was found that those fuels including the Lewis acid additives had a significant reduction in the overall mass increase. The fuel with no Lewis acid additives regularly yielded a mass gain equivalent to (and even surpassing) the theoretical mass gain calculated for 100% hydrate formation (i.e., the formation of lithium hydroxide hydrate in the final product). Those fuels containing the Lewis acid additives showed a substantial reduction in the excess mass (e.g., due to unwanted materials such as hydrates) and, in some instances have resulted in the total elimination of this excess mass gain in the product. Table 2 shows the final mass gain of the fuel Samples tested both without Lewis acid additives and with the additives.

TABLE 2

Decrease in byproduct production as compared to 100 wt % $LiAlH_4$.

| Sample | Fuel/additive | Average % increase over non-hydrated theoretical | % Mass increase over non-hydrated theoretical (range) | Number of times experiment was performed |
|---|---|---|---|---|
| 9 | 100 wt % $LiAlH_4$ | 44 | 40-50 | 4 |
| 6 | 75 wt % $LiAlH_4$, 20 wt % $AlCl_3$, 5% $TiO_2$ | 30 | 16-52 | 5 |

TABLE 2-continued

Decrease in byproduct production as compared to 100 wt % $LiAlH_4$.

| Sample | Fuel/additive | Average % increase over non-hydrated theoretical | % Mass increase over non-hydrated theoretical (range) | Number of times experiment was performed |
|---|---|---|---|---|
| 7 | 75 wt % $LiAlH_4$, 20 wt % $MgCl_2$, 5 wt % $TiO_2$ | 20 *11 | 16-24 *7-15 | 2 *2 |
| 8 | 75 wt % $LiAlH_4$, 20 wt % $ZrCl_4$, 5 wt % $TiO_2$ | 13 *9 | 2-28 *-1-18 | 4 *2 |
| 5 | 80 wt % $LiAlH_4$, 20 wt % $ZrCl_4$ | 11 *5 | 3-21 *-2-13 | 11 *6 |

An '*' indicates that the product obtained after completion of hydrogen production was observed to lose 8 to 14% of the initial weight gain as it sat in a dry glove box for 12 hours, which suggests that a portion of the weight gain recorded may be due to water being absorbed into the product, rather than the formation of unwanted byproducts. Only the samples marked with an '*' were placed in a dry box and subsequently reweighed.

The best performing fuel blend for reduced byproduct formation was 20 wt % zirconium chloride/80 wt % lithium aluminum hydride. Additional results are shown in Table 3.

TABLE 3

Results of Varied Additive Concentrations on Hydrate Elimination

| Sample | Fuel/additive | % Mass increase over non-hydrated theoretical |
|---|---|---|
| 10 | 90 wt % $LiAlH_4$, 10 wt % $AlCl_3$ | 25 |
| 1 | 80 wt % $LiAlH_4$, 20 wt % $AlCl_3$ | 30 |
| 11 | 75 wt % $LiAlH_4$, 25 wt % $AlCl_3$ | 29 |
| 12 | 70 wt % $LiAlH_4$, 30 wt % $AlCl_3$ | 38 |
| 13 | 90 wt % $LiAlH_4$, 10 wt % $ZrCl_4$ | 4 |
| 14 | 85 wt % $LiAlH_4$, 15 wt % $ZrCl_4$ | -4 |
| 5 | 80 wt % $LiAlH_4$, 20 wt % $ZrCl_4$ | 3 |
| 15 | 75 wt % $LiAlH_4$, 25 wt % $ZrCl_4$ | 33 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments.

The following exemplary embodiments are provided, the numbering of which is not to be construed as designating levels of importance:

Embodiment 1 provides a hydrogen-generating composition for a fuel cell, the hydrogen-generating composition comprising:
   a hydride; and
   a Lewis acid.

Embodiment 2 provides the hydrogen-generating composition of Embodiment 1, wherein the hydrogen-generating composition is sufficient to generate hydrogen upon contact with water.

Embodiment 3 provides the hydrogen-generating composition of any one of Embodiments 1-2, wherein the hydride is about 50 wt % to about 99.999 wt % of the hydrogen-generating composition.

Embodiment 4 provides the hydrogen-generating composition of any one of Embodiments 1-3, wherein the hydride is about 70 wt % to about 99.9 wt % of the hydrogen-generating composition.

Embodiment 5 provides the hydrogen-generating composition of any one of Embodiments 1-4, wherein the hydride is chosen from an ionic hydride, a covalent hydride, a metallic hydride, a transition metal hydride complex, and a combination thereof.

Embodiment 6 provides the hydrogen-generating composition of any one of Embodiments 1-5, wherein the hydride is chosen from magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof.

Embodiment 7 provides the hydrogen-generating composition of any one of Embodiments 1-6, wherein the hydride is chosen from lithium aluminum hydride ($LiAlH_4$), calcium hydride ($CaH_2$), sodium aluminum hydride ($NaAlH_4$), aluminum hydride ($AlH_3$), and a combination thereof.

Embodiment 8 provides the hydrogen-generating composition of any one of Embodiments 1-7, wherein the hydride is lithium aluminum hydride ($LiAlH_4$).

Embodiment 9 provides the hydrogen-generating composition of any one of Embodiments 1-8, wherein the hydrogen-generating composition only comprises a single hydride and is free of other hydrides.

Embodiment 10 provides the hydrogen-generating composition of any one of Embodiments 1-9, wherein the hydrogen-generating composition is free of simple hydrides that are a metal atom bound to a hydrogen atom.

Embodiment 11 provides the hydrogen-generating composition of any one of Embodiments 1-10, wherein the hydrogen-generating composition is free of lithium hydride and beryllium hydride.

Embodiment 12 provides the hydrogen-generating composition of any one of Embodiments 1-11, wherein the hydrogen-generating composition is substantially free of hydrides of aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), vanadium (V), tungsten (W), yttrium (Y), ytterbium (Yb), zinc (Zn), zirconium (Zr), and hydrides of organic cations including ($CH_3$) methyl groups.

Embodiment 13 provides the hydrogen-generating composition of any one of Embodiments 1-12, wherein the hydrogen-generating composition is substantially free of elemental metals.

Embodiment 14 provides the hydrogen-generating composition of any one of Embodiments 1-13, wherein the hydrogen-generating composition is substantially free of elemental aluminum.

Embodiment 15 provides the hydrogen-generating composition of any one of Embodiments 1-14, wherein the Lewis acid is about 0.001 wt % to about 50 wt % of the hydrogen-generating composition.

Embodiment 16 provides the hydrogen-generating composition of any one of Embodiments 1-15, wherein the Lewis acid is about 0.1 wt % to about 30 wt % of the hydrogen-generating composition.

Embodiment 17 provides the hydrogen-generating composition of any one of Embodiments 1-16, wherein the Lewis acid is chosen from aluminum chloride ($AlCl_3$), aluminum bromide ($AlBr_3$), aluminum fluoride ($AlF_3$), stannous (II) chloride ($SnCl_2$), stannous (II) bromide ($SnBr_2$), stannous (II) fluoride ($SnF_2$), magnesium chloride ($MgCl_2$), magnesium bromide ($MgBr_2$), magnesium fluoride ($MgF_2$), zirconium (IV) chloride ($ZrCl_4$), zirconium (IV) bromide ($ZrBr_4$), zirconium (IV) fluoride ($ZrF_4$), tungsten (VI) chloride ($WCl_6$), tungsten (VI) bromide ($WBr_6$), tungsten (VI) fluoride ($WF_6$), zinc chloride ($ZnCl_2$), zinc bromide ($ZnBr_2$), zinc fluoride ($ZnF_2$), ferric (III) chloride ($FeCl_3$), ferric (III) bromide ($FeBr_3$), ferric (III) fluoride ($FeF_3$), vanadium (III) chloride, vanadium (III) bromide, vanadium (III) fluoride, and a combination thereof.

Embodiment 18 provides the hydrogen-generating composition of any one of Embodiments 1-17, wherein the Lewis acid is chosen from aluminum chloride ($AlCl_3$), magnesium chloride ($MgCl_2$), zirconium (IV) chloride ($ZrCl_4$), and a combination thereof.

Embodiment 19 provides the hydrogen-generating composition of any one of Embodiments 1-18, wherein the Lewis acid is zirconium (IV) chloride ($ZrCl_4$).

Embodiment 20 provides the hydrogen-generating composition of any one of Embodiments 1-19, further comprising a metal oxide.

Embodiment 21 provides the hydrogen-generating composition of Embodiment 20, wherein the metal oxide is about 0.001 wt % to about 20 wt % of the hydrogen-generating composition.

Embodiment 22 provides the hydrogen-generating composition of any one of Embodiments 20-21, wherein the metal oxide is about 1 wt % to about 10 wt % of the hydrogen-generating composition.

Embodiment 23 provides the hydrogen-generating composition of any one of Embodiments 20-22, wherein the metal oxide is zirconium (IV) oxide, hafnium (IV) oxide, titanium (IV) oxide, or a combination thereof.

Embodiment 24 provides the hydrogen-generating composition of any one of Embodiments 20-23, wherein the metal oxide is titanium (IV) oxide.

Embodiment 25 provides the hydrogen-generating composition of any one of Embodiments 1-24, wherein the hydrogen-generating composition is in a form comprising grains or pellets.

Embodiment 26 provides the hydrogen-generating composition of any one of Embodiments 1-25, wherein the hydrogen-generating composition has a density of about 0.5 g/cm$^3$ to about 1.5 g/cm$^3$.

Embodiment 27 provides the hydrogen-generating composition of any one of Embodiments 1-26, wherein when contacted with water the hydrogen-generating composition forms fewer non-hydrogen materials as compared to a corresponding hydrogen-generating composition including less or none of the Lewis acid.

Embodiment 28 provides the hydrogen-generating composition of any one of Embodiments 1-27, wherein when contacted with water the hydrogen-generating composition forms fewer hydrates as compared to a corresponding hydrogen-generating composition including less or none of the Lewis acid.

Embodiment 29 provides the hydrogen-generating composition of any one of Embodiments 1-28, wherein when contacted with water the hydrogen-generating composition forms hydrogen gas at a higher rate as compared to a corresponding hydrogen-generating composition including less or none of the Lewis acid.

Embodiment 30 provides the hydrogen-generating composition of any one of Embodiments 1-29, wherein when contacted with water the hydrogen-generating composition forms hydrogen gas at a rate that is greater than about 1 to equal to or less than about 20 times greater as compared to a corresponding hydrogen-generating composition including less or none of the Lewis acid.

Embodiment 31 provides the hydrogen-generating composition of any one of Embodiments 1-30, wherein when contacted with water the hydrogen-generating composition forms hydrogen gas at a rate that is about 2.5 to about 7.5 times greater as compared to a corresponding hydrogen-generating composition including less or none of the Lewis acid.

Embodiment 32 provides the hydrogen-generating composition of any one of Embodiments 1-31, wherein when contacted with water the hydrogen-generating composition forms a greater amount of hydrogen gas per gram of the hydrogen-generating composition as compared to a corresponding hydrogen-generating composition including less or none of the Lewis acid.

Embodiment 33 provides a fuel cell system comprising:
  the hydrogen-generating composition of any one of Embodiments 1-32; and
  a hydrogen fuel cell fluidly connected to the hydrogen-generating composition.

Embodiment 34 provides the fuel cell system of Embodiment 33, wherein the fuel cell is a micro fuel cell.

Embodiment 35 provides a method of using a hydrogen fuel cell, the method comprising:
  contacting the hydrogen-generating composition of any one of Embodiments 1-32 with water vapor, to form hydrogen gas; and
  supplying the hydrogen gas to an electrode of the hydrogen fuel cell.

Embodiment 36 provides a method of making the hydrogen-generating composition of any one of Embodiments 1-32, the method comprising:
  forming a starting composition comprising the hydride and the Lewis acid; and
  mixing the starting composition, to form the hydrogen-generating composition of any one of Embodiments 1-32.

Embodiment 37 provides the method of Embodiment 36, wherein the mixing comprises mixing to substantial homogeneity.

Embodiment 38 provides the method of any one of Embodiments 36-37, wherein the mixing comprises milling.

Embodiment 39 provides the method of any one of Embodiments 36-38, wherein the mixing comprises milling with a mixing medium.

Embodiment 40 provides the method of Embodiment 39, wherein the mixing medium comprises metal beads, metal balls, or a combination thereof.

Embodiment 41 provides the method of any one of Embodiments 38-40, wherein the mixing comprises ball milling.

Embodiment 42 provides the method of any one of Embodiments 39-41, wherein the mixing comprises separating the mixing medium and the hydrogen-generating composition of any one of Embodiments 1-32.

Embodiment 43 provides a hydrogen-generating composition for a fuel cell, the hydrogen-generating composition comprising:
  a hydride chosen from lithium aluminum hydride (LiAlH$_4$), calcium hydride (CaH$_2$), sodium aluminum hydride (NaAlH$_4$), aluminum hydride (AlH$_3$), and a combination thereof, wherein the hydride is about 70 wt % to about 99.9 wt % of the hydrogen-generating composition; and
  a Lewis acid chosen from aluminum chloride (AlCl$_3$), magnesium chloride (MgCl$_2$), zirconium (IV) chloride (ZrCl$_4$), and a combination thereof, wherein the Lewis acid is about 0.1 wt % to about 30 wt % of the hydrogen-generating composition.

Embodiment 44 provides a hydrogen-generating composition for a fuel cell, the hydrogen-generating composition comprising:
  a hydride chosen from lithium aluminum hydride (LiAlH$_4$), calcium hydride (CaH$_2$), sodium aluminum hydride (NaAlH$_4$), aluminum hydride (AlH$_3$), and a combination thereof, wherein the hydride is about 60 wt % to about 90 wt % of the hydrogen-generating composition;
  a Lewis acid chosen from aluminum chloride (AlCl$_3$), magnesium chloride (MgCl$_2$), zirconium (IV) chloride (ZrCl$_4$), and a combination thereof, wherein the Lewis acid is about 5 wt % to about 30 wt % of the hydrogen-generating composition; and
  titanium (IV) oxide, wherein the titanium (IV) oxide is about 1 wt % to about 10 wt % of the hydrogen-generating composition.

Embodiment 45 provides a method of using a hydrogen fuel cell, the method comprising:
  contacting a hydrogen-generating composition with water vapor, to form hydrogen gas, the hydrogen-generating composition comprising
    a hydride, and
    a Lewis acid; and
  supplying the hydrogen gas to an electrode of the hydrogen fuel cell.

Embodiment 46 provides a method of using a hydrogen fuel cell, the method comprising:
  contacting a hydrogen-generating composition with water vapor, to form hydrogen gas, the hydrogen-generating composition comprising
    a hydride chosen from lithium aluminum hydride (LiAlH$_4$), calcium hydride (CaH$_2$), sodium aluminum hydride (NaAlH$_4$), aluminum hydride (AlH$_3$), and a combination thereof, wherein the hydride is about 70 wt % to about 99.9 wt % of the hydrogen-generating composition, and
    a Lewis acid chosen from aluminum chloride (AlCl$_3$), magnesium chloride (MgCl$_2$), zirconium (IV) chloride (ZrCl$_4$), and a combination thereof, wherein the Lewis acid is about 0.1 wt % to about 30 wt % of the hydrogen-generating composition; and
  supplying the hydrogen gas to an electrode of the hydrogen fuel cell.

Embodiment 47 provides the method of Embodiment 46, wherein the hydrogen-generating composition further comprises titanium (IV) oxide, wherein the titanium (IV) oxide is about 1 wt % to about 10 wt % of the hydrogen-generating composition.

Embodiment 48 provides a fuel cell system comprising:
  a hydrogen-generating composition comprising
    a hydride, and
    a Lewis acid; and
  a hydrogen fuel cell fluidly connected to the hydrogen-generating composition.

Embodiment 49 provides a fuel cell system comprising:
a hydrogen-generating composition comprising
a hydride chosen from lithium aluminum hydride (LiAlH$_4$), calcium hydride (CaH$_2$), sodium aluminum hydride (NaAlH$_4$), aluminum hydride (AlH$_3$), and a combination thereof, wherein the hydride is about 70 wt % to about 99.9 wt % of the hydrogen-generating composition, and
a Lewis acid chosen from aluminum chloride (AlCl$_3$), magnesium chloride (MgCl$_2$), zirconium (IV) chloride (ZrCl$_4$), and a combination thereof, wherein the Lewis acid is about 0.1 wt % to about 30 wt % of the hydrogen-generating composition; and
a hydrogen fuel cell fluidly connected to the hydrogen-generating composition.

Embodiment 50 provides the fuel cell system of Embodiment 49, wherein the hydrogen-generating composition further comprises titanium (IV) oxide, wherein the titanium (IV) oxide is about 1 wt % to about 10 wt % of the hydrogen-generating composition.

Embodiment 51 provides a method of making a hydrogen-generating composition, the method comprising:
forming a starting composition, the starting composition comprising
a hydride, and
a Lewis acid; and
mixing the starting composition to substantial homogeneity, to form the hydrogen-generating composition.

Embodiment 52 provides a method of making a hydrogen-generating composition, the method comprising:
forming a starting composition, the starting composition comprising
a hydride chosen from lithium aluminum hydride (LiAlH$_4$), calcium hydride (CaH$_2$), sodium aluminum hydride (NaAlH$_4$), aluminum hydride (AlH$_3$), and a combination thereof, wherein the hydride is about 70 wt % to about 99.9 wt % of the starting composition, and
a Lewis acid chosen from aluminum chloride (AlCl$_3$), magnesium chloride (MgCl$_2$), zirconium (IV) chloride (ZrCl$_4$), and a combination thereof, wherein the Lewis acid is about 0.1 wt % to about 30 wt % of the starting composition; and
mixing the starting composition to substantial homogeneity, to form the hydrogen-generating composition.

Embodiment 53 provides the method of Embodiment 52, wherein the hydrogen-generating composition further comprises titanium (IV) oxide, wherein the titanium (IV) oxide is about 1 wt % to about 10 wt % of the hydrogen-generating composition.

What is claimed is:

1. A hydrogen-generating composition for a fuel cell, wherein the hydrogen-generating composition consisting essentially of:
a hydride, wherein the hydride is lithium aluminum hydride (LiAlH$_4$) and is about 50 wt % to about 99.999 wt % of the hydrogen-generating composition, and wherein the hydrogen-generating composition is free of other hydrides; and
a Lewis acid chosen from aluminum chloride (AlCl$_3$), aluminum bromide (AlBr$_3$), aluminum fluoride (AlF$_3$), stannous (II) chloride (SnCl$_2$), stannous (II) bromide (SnBr$_2$), stannous (II) fluoride (SnF$_2$), zirconium (IV) chloride (ZrCl$_4$), zirconium (IV) bromide (ZrBr$_4$), zirconium (IV) fluoride (ZrF$_4$), tungsten (VI) chloride (WCl$_6$), tungsten (VI) bromide (WBr$_6$), tungsten (VI) fluoride (WF$_6$), zinc bromide (ZnBr$_2$), zinc fluoride (ZnF$_2$), ferric (III) chloride (FeCl$_3$), ferric (III) bromide (FeBr$_3$), ferric (III) fluoride (FeF$_3$), vanadium (III) chloride, vanadium (III) bromide, vanadium (III) fluoride, and combinations thereof; and
optionally a metal oxide.

2. The hydrogen-generating composition of claim 1, wherein the Lewis acid is about 0.001 wt % to about 50 wt % of the hydrogen-generating composition.

3. The hydrogen-generating composition of claim 1, wherein the Lewis acid is chosen from aluminum chloride (AlCl$_3$), zirconium (IV) chloride (ZrCl$_4$), and a combination thereof.

4. The hydrogen-generating composition of claim 1, wherein the Lewis acid is zirconium (IV) chloride (ZrCl$_4$).

5. The hydrogen-generating composition of claim 1, further comprising a metal oxide.

6. The hydrogen-generating composition of claim 5, wherein the metal oxide is about 0.001 wt % to about 20 wt % of the hydrogen-generating composition.

7. The hydrogen-generating composition of claim 5, wherein the metal oxide is zirconium (IV) oxide, hafnium (IV) oxide, titanium (IV) oxide, or a combination thereof.

8. A fuel cell system comprising:
the hydrogen-generating composition of claim 1; and
a hydrogen fuel cell fluidly connected to the hydrogen-generating composition.

9. A method of making the hydrogen-generating composition of claim 1, the method comprising:
forming a starting composition comprising the hydride and the Lewis acid; and
mixing the starting composition, to form the hydrogen-generating composition of claim 1.

10. A hydrogen-generating composition for a fuel cell, the hydrogen-generating composition consisting essentially of:
a hydride that is lithium aluminum hydride (LiAlH$_4$), wherein the hydride is about 70 wt % to about 99.9 wt % of the hydrogen-generating composition, wherein the hydrogen-generating composition is free of other hydrides;
a Lewis acid chosen from aluminum chloride (AlCl$_3$), zirconium (IV) chloride (ZrCl$_4$), and a combination thereof, wherein the Lewis acid is about 0.1 wt % to about 30 wt % of the hydrogen-generating composition; and
optionally a metal oxide.

11. A method of using a hydrogen fuel cell, the method comprising:
contacting a hydrogen-generating composition with water vapor produced by the hydrogen fuel cell, to form hydrogen gas, the hydrogen-generating composition consisting essentially of:
a hydride, wherein the hydride is lithium aluminum hydride (LiAlH$_4$) and wherein the hydrogen-generating composition is free of other hydrides, and
a Lewis acid chosen from aluminum chloride (AlCl$_3$), aluminum bromide (AlBr$_3$), aluminum fluoride (AlF$_3$), stannous (II) chloride (SnCl$_2$), stannous (II) bromide (SnBr$_2$), stannous (II) fluoride (SnF$_2$), zirconium (IV) chloride (ZrCl$_4$), zirconium (IV) bromide (ZrBr$_4$), zirconium (IV) fluoride (ZrF$_4$), tungsten (VI) chloride (WCl$_6$), tungsten (VI) bromide (WBr$_6$), tungsten (VI) fluoride (WF$_6$), zinc bromide (ZnBr$_2$), zinc fluoride (ZnF$_2$), ferric (III) chloride (FeCl$_3$), ferric (III) bromide (FeBr$_3$), ferric (III) fluoride (FeF$_3$), vanadium (III) chloride, vanadium (III) bromide, vanadium (III) fluoride, and combinations thereof; and optionally a metal oxide; and supplying the hydrogen gas to an electrode of the hydrogen fuel cell.

12. The method of claim 11, wherein the Lewis acid chosen from aluminum chloride ($AlCl_3$), zirconium (IV) chloride ($ZrCl_4$), and a combination thereof.

13. The method of claim 11, wherein the metal oxide is zirconium (IV) oxide, hafnium (IV) oxide, titanium (IV) oxide, or a combination thereof.

14. The method of claim 11, wherein the metal oxide is titanium (IV) oxide.

15. The hydrogen-generating composition of claim 5, wherein the metal oxide is titanium (IV) oxide.

* * * * *